US012112235B2

(12) United States Patent
Allen et al.

(10) Patent No.: US 12,112,235 B2
(45) Date of Patent: Oct. 8, 2024

(54) PORT SERVER FOR HETEROGENEOUS HARDWARE

(71) Applicant: IonQ Inc., College Park, MD (US)

(72) Inventors: Stewart Allen, Reston, VA (US);
Aleksey Blinov, Evanston, IL (US);
Felix Tripier, Washington, DC (US)

(73) Assignee: IonQ Inc., College Park, MD (US)

( * ) Notice: Subject to any disclaimer, the term of this patent is extended or adjusted under 35 U.S.C. 154(b) by 507 days.

(21) Appl. No.: 17/333,439

(22) Filed: May 28, 2021

(65) Prior Publication Data

US 2022/0383173 A1    Dec. 1, 2022

(51) Int. Cl.
*G06N 10/00*    (2022.01)
*B82Y 10/00*    (2011.01)
*G06N 10/40*    (2022.01)
*H04L 9/08*    (2006.01)

(52) U.S. Cl.
CPC ............. *G06N 10/00* (2019.01); *B82Y 10/00* (2013.01); *G06N 10/40* (2022.01); *H04L 9/0852* (2013.01)

(58) Field of Classification Search
None
See application file for complete search history.

(56) References Cited

U.S. PATENT DOCUMENTS

| | | | |
|---|---|---|---|
| 2015/0324180 A1* | 11/2015 | Tredoux | G06F 13/102 719/321 |
| 2017/0078193 A1* | 3/2017 | Cui | H04L 12/6418 |
| 2017/0167746 A1* | 6/2017 | Harris | G05B 13/0265 |
| 2017/0262265 A1* | 9/2017 | Kellicker | G06F 8/51 |
| 2018/0159902 A1* | 6/2018 | Murphy | H04L 63/029 |
| 2018/0365585 A1* | 12/2018 | Smith | G06N 10/00 |
| 2019/0073481 A1* | 3/2019 | Angelino | G06F 8/65 |
| 2020/0344205 A1* | 10/2020 | Majkowski | H04L 45/72 |
| 2020/0383158 A1* | 12/2020 | Misra | H04L 65/403 |

* cited by examiner

*Primary Examiner* — Jay L Vogel
(74) *Attorney, Agent, or Firm* — Butzel Long

(57) ABSTRACT

Systems and techniques are provided for a port server for heterogeneous hardware. A port server may include computing devices that may include multiple connection types. Storage devices may be connected to the computing devices. The computing devices may receive a communication from an external computing device intended for a hardware device of a heterogenous system over one of the connection types. The communication may be sent to the hardware device of the heterogenous system using one of the connection types. A response may be received from the hardware device of the heterogenous system over the connection type used to send the communication to the hardware device. The response from the hardware device of the heterogenous system may be sent to the external computing device over the connection type over which the communication was received from the external computing device.

24 Claims, 12 Drawing Sheets

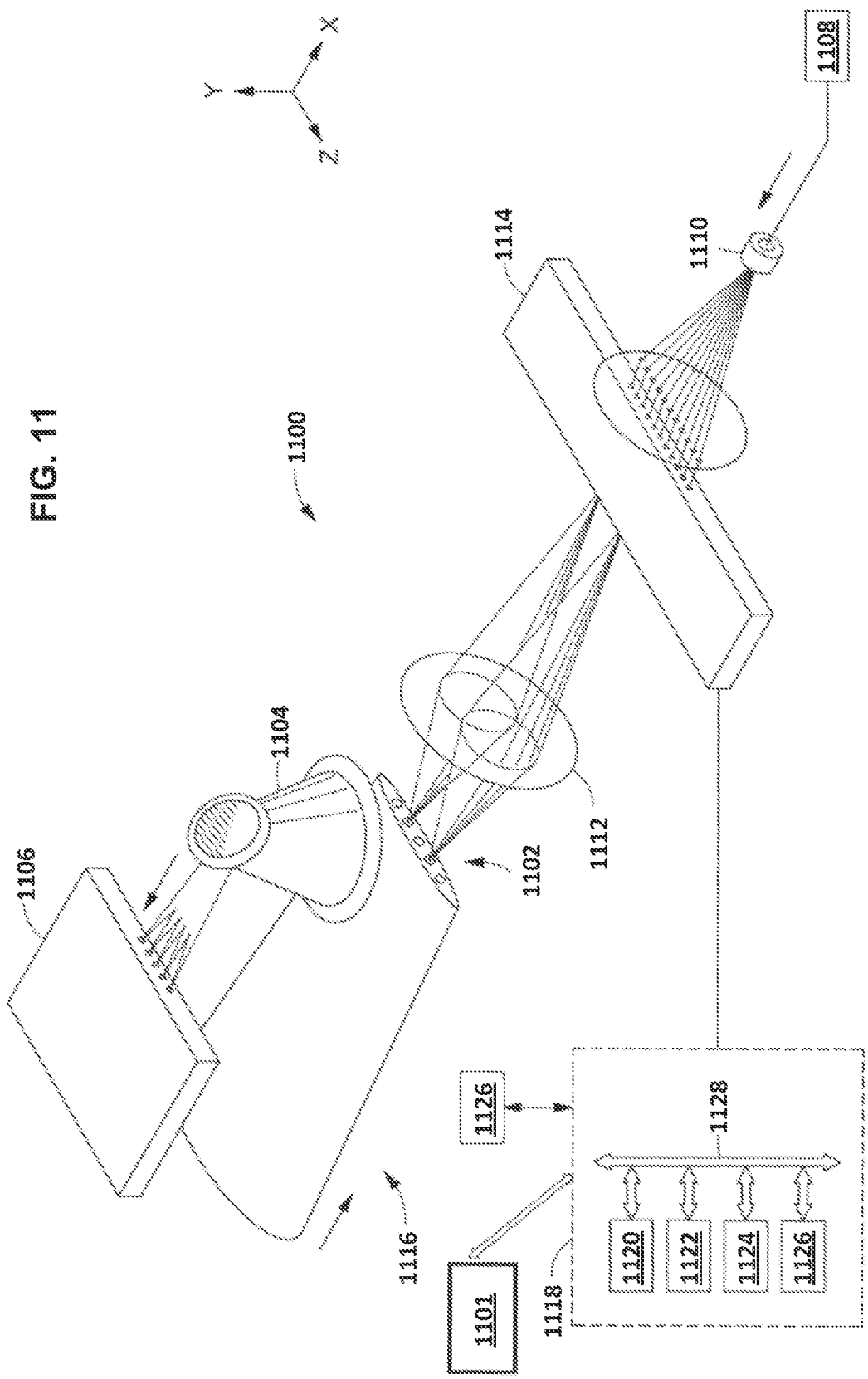

PORT SERVER FOR HETEROGENEOUS HARDWARE

BACKGROUND

Quantum computers may operate using various different types of hardware that may be controlled by classical computing devices. Using homogenous hardware, such as hardware from the same manufacturer, in a quantum computer may not be cost effective, and may make maintaining the quantum computer in an operating state more difficult as replacement hardware may be harder to obtain.

BRIEF SUMMARY

According to implementations of the disclosed subject matter, a port server may include computing devices that may include multiple connection types. Storage devices may be connected to the computing devices. The computing devices may receive a communication from an external computing device intended for a hardware device of a heterogenous system over one of the connection types. The communication may be sent to the hardware device of the heterogenous system using one of the connection types. A response may be received from the hardware device of the heterogenous system over the connection type used to send the communication to the hardware device. The response from the hardware device of the heterogenous system may be sent to the external computing device over the connection type over which the communication was received from the external computing device.

Systems and techniques disclosed herein may allow for a port server for heterogeneous hardware. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 11 shows a partial view of an ion trap quantum computer according to an embodiment of the disclosed subject matter.

DETAILED DESCRIPTION

Figure 1:
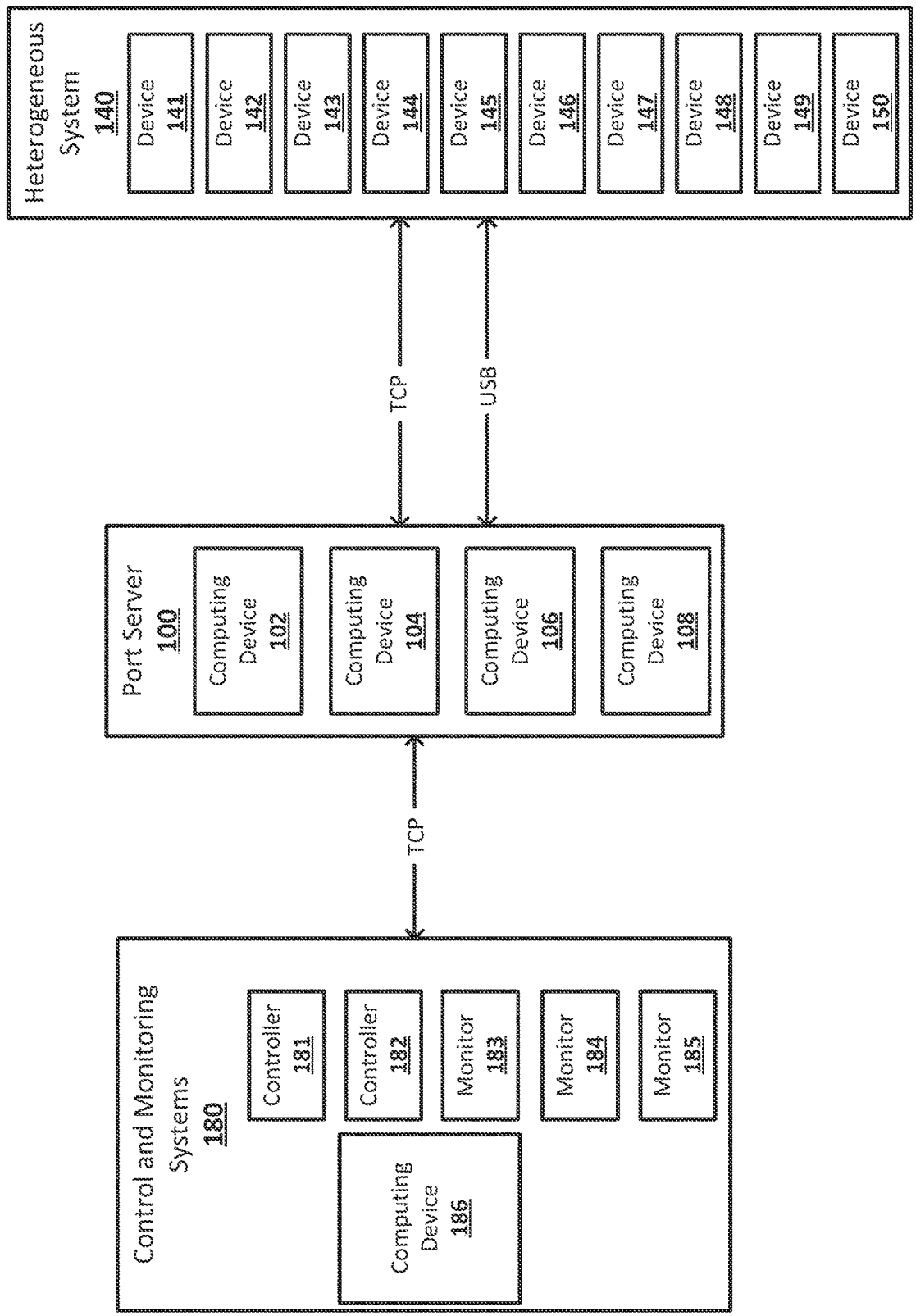
FIG. 1 shows an example system suitable for a port server for heterogeneous hardware according to an implementation of the disclosed subject matter.

According to embodiments disclosed herein, a port server for heterogeneous hardware may allow for the management of heterogeneous hardware devices. The heterogeneous hardware devices may be part of a heterogenous system, such as a quantum computing device. A port server may include a number of computing devices that may be connected to the heterogenous hardware devices through multiple connection types. The port sever may allow for control and monitoring systems to communicate with the heterogenous hardware devices, including sending commands to and receiving responses from the heterogenous hardware devices, by exposing the heterogenous hardware devices as endpoints of a single connection type, such as TCP. The port server may automatically make newly connected heterogenous hardware devices available, and may include a directory used by the control and monitoring systems to communicate with the heterogenous hardware devices. The port server may multiplex communications between control and monitoring systems and the heterogenous hardware devices to allow multiple control and monitoring systems to communicate with the same one of the heterogenous hardware devices. The port server may include drivers for the heterogenous hardware devices, and may allow control and monitoring system to interact with heterogenous hardware devices of the same type but different models or manufacturers in the same manner. The port server may control firmware upgrades for the heterogenous hardware devices.

A port server may be used to manage heterogeneous hardware devices. The heterogeneous hardware devices may be part of any suitable heterogenous system, such as, for example, security systems, control systems, or quantum computing devices. For example, a trapped ion quantum computing device may include cameras, servo motors, linear motors, mirrors mounted on motors, lasers, temperature controllers and temperature sensors, power meters, controllable power supplies, radio frequency devices, hexapod alignment devices, mini-classical computing devices, coherent control systems, acousto-optic modulators, trap electrodes, digital servos used for laser locking, network switches including power over ethernet that may be used to turn cameras on and off through power over ethernet.

The hardware devices used in a heterogenous system such as a trapped ion quantum computing device may be from different manufacturers and may also include different models of the same type of device from the same manufacturer. For example, the cameras and the lasers of a trapped ion quantum computing device may be from different manufacturers, and cameras from the same manufacturer may be different models, for example, having different features, being manufactured in different years, or otherwise being different despite being the same type of device from the same manufacturer. Different cameras may also be from different manufacturers.

The heterogeneous hardware devices may use a variety of connection types. For example, some of the hardware devices may use USB connections, for example, through a USB cable, to connect to and communicate with a computing device, while other hardware devices may use TCP connections, for example, through an ethernet cable, to connect to and communicate with a computing device. The number of heterogenous hardware devices in a heterogenous system, such as a trapped ion quantum computing device, may be greater than the number that a single computing device can host through a direct connection, such as through USB connections. For example, a single computing device may have an upper limit on the number of USB devices that computing device can host. Hardware devices that use TCP may only allow for a single connection to the hardware device at a given time, which may make it difficult for various control and monitoring systems of the heterogenous system to communicate effectively with the hardware devices using TCP.

The port server may be implemented using any suitable computing devices and systems, including, for example, multiple computing devices in a stand-alone, network attached server system. The heterogenous hardware devices of the heterogeneous system, for example, trapped ion quantum computing device, may be connected to the port server through TCP and USB connections. The port server may use multiple computing devices with separate USB hosts, allowing for the port server to support direct connection to more USB computing devices than would be possible with an individual computing device. USB hubs may be used as necessary to increase the number of USB hardware devices that can be connected to any of the multiple computing devices of the port server. Each of the computing devices of the port server may run a service that implements the port server across the computing devices and allows the multiple computing devices to operate as the port server. The computing devices of the port server may be, for example, low cost and low power computing devices.

The port server may make communication with the heterogenous hardware devices available to other computing devices through TCP connections. The TCP connections may be normalized and labelled, so that each of the hardware device may be presented by the port server as a TCP endpoint. The port server may provide a directory service that may include a directory listing all of the heterogeneous hardware devices connected to the port server. Each of the heterogenous hardware devices connected to the port server may be assigned a unique identifier by the port server. The unique identifiers may be listed in the directory accessible through the directory service. Control and monitoring systems may be able to communicate with the heterogenous hardware devices through a TCP connection with the port sever using the unique identifiers assigned to the heterogenous hardware devices by the port server. The unique identifiers may be in any suitable format, and may, for example, be based on hardware identifiers of the heterogenous hardware devices, or may be, for example, semantic identifiers that may be descriptive of the heterogenous hardware devices that the identifiers are assigned to. For example, a thermostat device may be assigned a unique identifier of "thermostat 1".

Control and monitoring systems of the heterogenous system may communicate with the heterogenous hardware devices through TCP communication with the port server. The control and monitoring systems of the heterogenous system may be any suitable systems and devices, including general purpose and special purpose classical computing devices and electronics, that may control the heterogenous hardware devices to operate the heterogenous system and monitor the telemetry and environmental parameters of the heterogenous hardware devices and the heterogenous system. The control and monitoring systems may use the directory service to locate and communicate with the heterogenous hardware devices, regardless of the relative physical locations of the control and monitoring systems and the heterogenous hardware devices. This may allow more flexibility in where components of the heterogenous system are physically located while still allowing for the control and monitoring systems to communicate with the heterogenous hardware devices.

The port server may allow multiplexed communication between control and monitoring systems and the heterogenous hardware devices of the hardware system. The port sever may, for example, multiplex communications from different control and monitoring systems that are intended for a single heterogenous hardware device. The multiplexing, and demultiplexing, of the communications may be transparent both to the control and monitoring systems and to the heterogenous hardware devices, as the port server my control the multiplexing itself. The port server may multiplex communications using time division, for example, providing each control and monitoring system a window in which to communicate with a specific hardware device, and the port server may adjust the timings used in the time division. The port server may sequence communications sent to the same one of the heterogenous hardware devices. The sequencing of communications may be performed based on any suitable criteria, and may ensure that, for example, commands contained in the communications are sent to the hardware device and executed by the device in an appropriate order. The port server may batch together and sequence communications from control and monitoring systems intended for one of the heterogenous hardware devices before sending the batched and sequenced communications to that one of the heterogenous hardware devices. The port server may batch communications by building a packet that includes several commands, and if the response is unicast and not broadcast, a control packet that may indicate how many end of response delimiters are expected in the response from the hardware device. For example, a packet that batches together four commands may result in the port server expecting to see four new line characters from the hardware device in response to the packet. The port server may ensure that responses from the hardware device are sent back to the appropriate control and monitoring system, and may, in cases where the hardware device does not automatically produce a response, send a communication requesting a response. The port server may also determine when data transmitted by a control or monitoring system, or by any of the heterogenous hardware devices, should be isolated as a unicast communication or should be a broadcast communication.

When more than one client computing device, such as a control or monitoring system, is attempting to actively communicate with a single one of the heterogenous hardware devices, the port server may cause that client to create a packet for its communication instead of the client sending an unconstrained stream of date. The packet may allow any number of commands in the packet to be sequenced and sent to the hardware device as one unit, ensuring that the commands aren't interrupted by communications from another client. The port server, upon receiving a packet from a client intended for a hardware device, may finish sending the packet to the hardware device before the port server will process any other request from any other client to communicate with that hardware device.

Some responses from hardware devices may be broadcast to all clients by the port server. The response may include the command that was sent to the hardware device to cause the response, which may allow the client that sent the command to determine that the broadcast response is the response to the command that client sent. Packet sent from the client device to the port server may include the delimiter of the expected response from the hardware device, and a timeout value for the expected response. The port server may use unicast demultiplexing to ensure that a response from a hardware device only goes back to the client that submitted the command that resulted in the response and to no other client if the response is received at the port server within the time period set by the timeout value in the packet received from the client. The packet may also, for example, specify the length of the expected response, or any other suitable feature of the expected response from the hardware device. The packet may be encoded in any suitable manner, including, for example, in Base64.

If a hardware device does not send a response within the time period set by the timeout value, the port server may need reset state on both the hardware device and on the client that sent the command the hardware device didn't respond to. The port server may close the com port to the hardware device and close all sockets to any clients that communicate with the hardware device, which may result in the hardware device and clients resetting their connections and reconnecting. This may be a general recovery procedure used by the port server when communications with any of the heterogenous hardware devices appears to have timed out.

Hardware devices may communicate in a reporting mode. When a hardware device is communicating in a reporting mode, it may send unsolicited periodic communications that are not in response to a communication from a client computing device. For example, a hardware device may automatically send out status updates indicating its own status at any suitable times, even if no client computing device has sent a request to the hardware device for a status update. A hardware device may send out communications, such as status updates, in reporting mode at any suitable time and interval, with any suitable frequency, and/or based on the occurrence of any suitable events as determined by the hardware device. The port server may be configured to use broadcast demultiplexing for hardware device that is communicating in reporting mode. When a hardware device for which the port server is configured to use broadcast demultiplexing sends a communication to the port server in reporting mode, the port server may broadcast the communication from the hardware device to all client computing devices that connected to the devices endpoint on the port server.

A hardware device that communicates in reporting mode may receive communications from client computing devices that modify the hardware device's use of reporting mode communications. For example, a client computing device may send a hardware device a command through the port server that enables or disables the reporting mode communication of status updates by the hardware device, or that modifies the frequency at which the hardware device sends communications with status updates in reporting mode.

The type of multiplexing and demultiplexing used by the port server may be determined by device type, rather than being determined for each individual hardware device. For example, the port server may use packet multiplexing and broadcast demultiplexing for all high-speed digital servos. This may allow the port server to implement uniform multiplexing and demultiplexing across hardware devices that are of the same device type.

The port server may include drivers for the heterogenous hardware devices. The drivers to allow communication with the heterogenous hardware devices may be installed on the port server, for example, on the multiple computing devices on the port server. The port server may use the drivers for one of the heterogenous hardware devices to handle communication with that one of the heterogenous hardware devices. The port server may include a front-end interface for each of the heterogenous hardware devices that may be based on each of the heterogenous hardware device protocols, for example, as implemented by the drivers. The front-end interface for a hardware device may allow for an interface for the hardware device to be presented to a user of a control or monitoring system through the port server, and for the user to access a driver-implemented user interface for the hardware device. The driver for a hardware device may also control whether the port server uses flow control to manage the rate of communication with the hardware device.

The port server may detect newly connected hardware devices. When a newly connected hardware device is connected, the port server may know the type of serial communication parameters to use to communicate with the hardware device, may claim the hardware device, and may automatically allocate a TCP port to hardware device to allow the hardware device to be presented as a TCP endpoint to clients, such as control and monitoring systems for the heterogenous system.

The port server may track how many clients are connected to any particular hardware device at any time, and may include a user interface that may show the port numbers of the clients that are connected to a hardware device. For example, a local controller system and a monitoring system may have open connections to the same hardware device at the same time.

Client computing devices may use any suitable data provided by the port server to determine which hardware devices to communicate with. For example, the client computing devices may use the baud rate, flow control mode, TCP port number, or any other communication parameter for a hardware device, or the device type of the hardware device, or any other data available about a hardware device, such as hardware identification numbers, manufacturer, model, and firmware version identifiers, as presented by the port server when selecting a hardware device to communicate with. A client computing device may request that the port server present to it all hardware devices that meet criteria specified by the client computing device. This may, for example, allow a client computing device to select all devices of the same type to communicate with through the port server. This may also allow for the upgrading of firmware of multiple hardware devices.

The port server may use the device types of the hardware devices to determine whether a device has a firmware update or another configuration capability, and to determine how to use such a capability, for example, to update the firmware of the hardware device. For example, high-speed digital servos used for laser frequency locking may be assigned a unique device type that may be used by the port server, or a client computing device, to select all such high-speed digital servos without selecting other hardware device. The port server may link the device type to a firmware update utility and communication settings that may allow for firmware updates to be performed over connections other than serial or USB connections that may typically be used, such as over TCP connections provided by the port server. Firmware update procedures for devices of the same type, that use the same firmware, may then be invoked with a desired firmware image via the port server in a uniform way.

The port server may abstract and automate the way clients interact with the heterogenous hardware devices of the heterogenous system. Devices of the same type from different manufactures, and different devices of the same type from the same manufacturer, may be made to appear to clients as if they are the same type of device from the same manufacturer. This may simplify how clients, such as control and monitoring systems, interact with the heterogeneous hardware devices, as the clients may not need to know serial port setting or other proprietary settings of the individual devices in order to communicate with and send commands to the devices, as the port server may handle this transparently to the clients. Clients may be unaware that they are not the only client communicating with any particular hardware device The port server may allow for control of firmware upgrades of the heterogenous hardware devices. The port server may include an application programming interface (API) service that may be used to manage the firmware of the heterogenous hardware devices, including, for example, upgrading the firmware. Firmware upgrades may be provided to heterogenous hardware devices from control system through the port server, obviating the need for the firmware upgrade to be performed from a computing device connected directly to any of the heterogenous hardware devices.

FIG. 1 shows an example system suitable for a port server for heterogeneous hardware according to an implementation of the disclosed subject matter. A port server 100 may include multiple computing devices, such as the computing devices 102, 104, 106, and 108. The port server 100 may be, for example, a stand-alone, network attached server system. The computing devices 102, 104, 106, and 108 may be any suitable devices, such as, for example, computers such as the computer 20 as described in FIG. 9. Each of the computing devices 102, 104, 106, and 108 may be a single computing device, or may include multiple connected computing devices, and may be, for example, a laptop, a desktop, an individual server, a server farm, or a distributed server system, or may be a virtual computing device or system. The computing devices 102, 104, 106, and 108 may be, for example, low-power general purposes computing devices.

The port server 100 may be implemented on the computing devices 102, 104, 106, and 108 using any suitable combination of hardware and software. The port server 100 may, for example, be implemented using any number of services executing on the computing devices 102, 104, 106, and 108. The computing devices 102, 104, 106, and 108 may include ports for connecting to other devices, including heterogenous hardware devices. For example, the computing devices 102, 104, 106, and 108 may include USB ports of any suitable type and network ports and connections of any suitable type, including, for example, wireless network connections and wired connections such as ethernet connections. The computing devices 102, 104, 106, and 108 may also include storage, which include any suitable combination of volatile and non-volatile storage hardware.

A heterogenous system 140 may be a system or device that includes any number of heterogenous devices. The heterogenous system 140 may be, for example, a trapped ion quantum computing device such as, for example, trapped ion quantum computer, or system, 1100 as described in FIG. 11. The heterogenous system 140 may, for example, include devices 141, 142, 143, 144, 145, 146, 147, 148, 149, and 150, which may be heterogenous hardware devices of any suitable type from any manufacturers, such as, for example, cameras, servo motors, linear motors, mirrors mounted on motors, lasers, temperature controllers and temperature sensors, power meters, controllable power supplies, radio frequency devices, hexapod alignment devices, mini-classical computing devices, coherent control systems, acousto-optic modulators, trap electrodes, digital servos used for laser locking, and network switches including power over ethernet that may be used to turn cameras on and off through power over ethernet. For example, a trapped ion quantum computer, such as the system 1100, may include an imaging objective 1104, a multi-channel photo-multiplier tube (PMT) 1106 for measurement of individual ions, a laser 1108, a diffractive beam splitter 1110, and a multichannel acousto-optic modulator (AOM) 1114.

Different ones of the devices of the heterogenous system 140 may use different forms of connection with the port server 100. For example, some of the devices 141, 142, 143, 144, 145, 146, 147, 148, 149, and 150 may be connected to the port server 100 through a USB connection, being plugged into a USB port of, or hub that is plugged into USB port of, one of the computing devices 102, 104, 106, and 108. The devices of the heterogenous system 140 that use USB may have their USB connections distributed amongst the computing devices 102, 104, 106, and 108, as no single computing device may be able to properly host all of the USB devices of the heterogenous system 140. Some of the devices 141, 142, 143, 144, 145, 146, 147, 148, 149, and 150 may be connected to the port server 100 through a TCP connection, for example, being connected to the same local area network or wide area network as the computing devices 102, 104, 106, and 108.

Control and monitoring systems 180 may be any suitable systems and devices for controlling and monitoring the operation of the heterogenous system 140, including the devices 141, 142, 143, 144, 145, 146, 147, 148, 149, and 150, and may be computing devices that are external to the port server 100, and may have orthogonal purposes. The orthogonal purposes may include control and monitoring of various aspects of the heterogenous system 140, and may include other purposes. The control and monitoring systems 180 may, for example, be controlling and monitoring systems and devices for controlling and monitoring hardware devise of a trapped ion quantum computing device, including, for example, controllers for lasers, cameras, motors, and other controllable components of a trapped ion quantum computing device and monitors that measure various aspects of the status of the trapped ion quantum computing device and its components. The control and monitoring systems 180 may include, for example, controllers 181 and 182, monitors 183, 184, and 185, and computing device 186. The controllers 181 and 182 may be any suitable combination of hardware and software for controlling operations of the heterogeneous system 140, including controlling devices such as the devices 141, 142, 143, 144, 145, 146, 147, 148, 149, and 150. For example, the controller 181 may be a controller for the lasers of a trapped ion quantum computing device. The computing device 186 may be any suitable computing device 186. The monitors 183, 184, and 185 may be any suitable combination of hardware and software for monitoring the status of the heterogenous system 140, including monitoring devices such as the devices 141, 142, 143, 144, 145, 146, 147, 148, 149, and 150. For example, the monitor 183 may be a temperature monitor which may use temperature sensors in a trapped ion quantum computing device to monitor the temperature of the trapped ion quantum computing device and provide temperature readings to other components of the control and monitoring system 180. The computing device 186 may be any suitable computing device, such as the computer 20 in FIG. 9, that may be connected to the control and monitoring systems 180, including the controllers 181 and 182 and the monitors 183, 184, and 185. The computing device 186 may, for example, allow for integrated control of the controllers 181 and 182, and the monitors 183, 184, and 185 and the communication of data therebetween to manage the operation of the heterogenous system 140. For example, the heterogenous system 140 may be a trapped ion quantum computing device and the computing device 186 may be a classical computing device that runs any suitable combination of programs, services, and operating system for managing the operation of the trapped ion quantum computing device. The computing device 186 may, for example, use the controllers 181 and 182 to control the devices of the heterogenous system 140, and use the monitors 183, 184, and 185 to monitor the status of the heterogenous system 140 and its devices. The computing device 186 may include a user interface that may be accessible to a user at the computing device 186, or through a connection to the computing device 186, to allow the user to control and monitor the heterogenous system 140.

The port server 100 may be connected to the control and monitoring systems 140 through a TCP connection. The connection may be made in any suitable manner. For example, the control and monitoring systems 180, including the controllers 181 and 182 and the monitors 183, 184, and 185 may be connected to the computing device 186 through any suitable connections, including TCP or USB connections, and the computing device 186 may connect to the port server 100 through a TCP connection, or the controllers 181 and 182 and the monitors 183, 184, and 185 may themselves be connected through a TCP connection to the port server 100.

The port server 100 may expose the devices of the heterogenous system 140, such as the devices 141, 142, 143, 144, 145, 146, 147, 148, 149, and 150, to the control and monitoring systems 180 as TCP endpoints. For every device of the heterogenous system 140 that connects to the port server 100, the port server 100 may assign the device a TCP port and a unique identifier that may be listed in a directory accessible through a directory service running on the port server 100. The control and monitoring systems 180 may be able to communicate with the devices of the heterogenous system 140 over TCP through the port server 100, for example, issuing commands to the devices and receiving responses from the devices. The port server 100 may manage the communications between the control and monitoring systems 180 and the devices of the heterogenous system.

Figure 2:
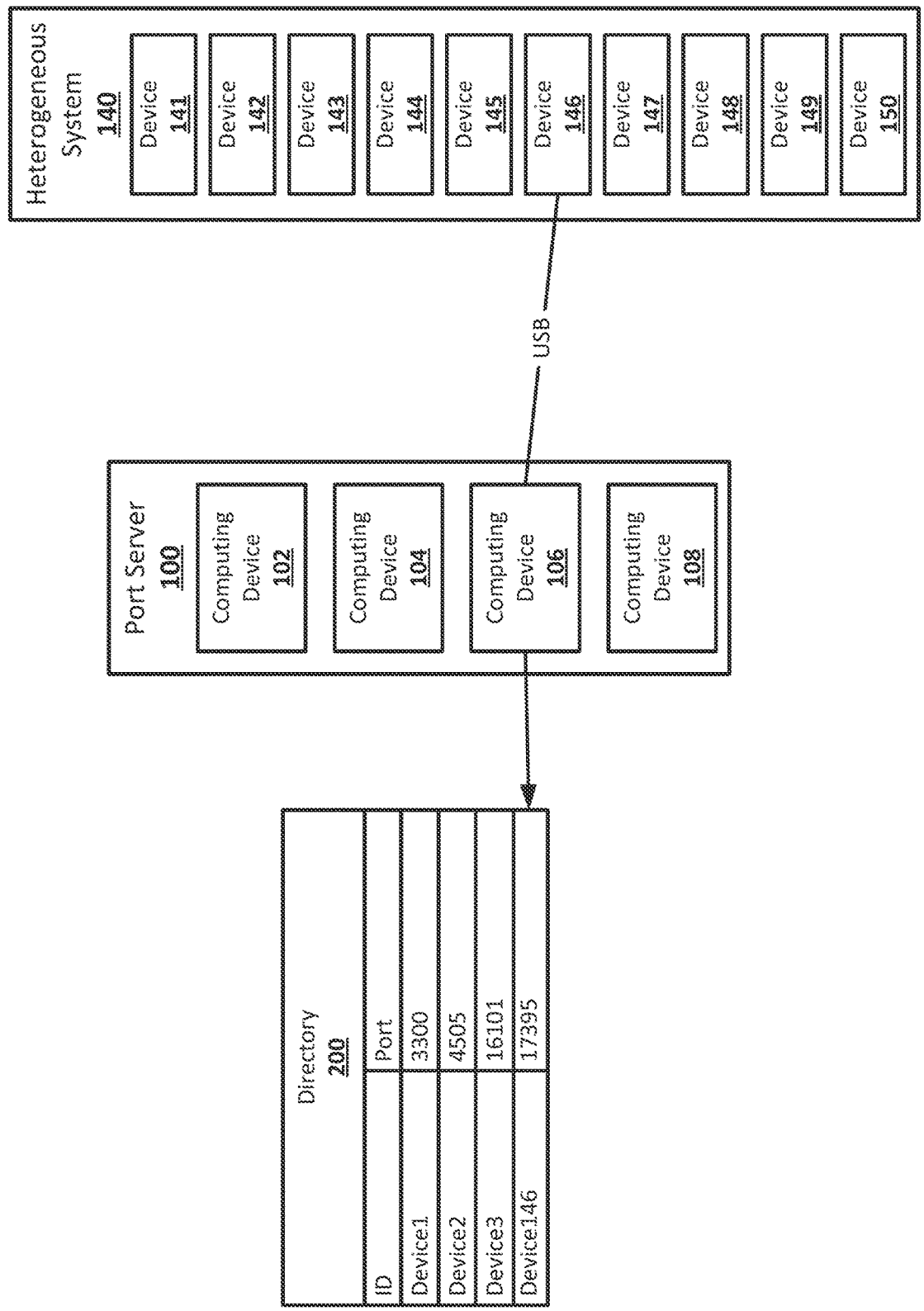
FIG. 2 shows an example arrangement suitable for a port server for heterogeneous hardware according to an implementation of the disclosed subject matter.

FIG. 2 shows an example arrangement suitable for a port server for heterogeneous hardware according to an implementation of the disclosed subject matter. The port server 100 may automatically allocate a TCP port to any hardware device of the heterogenous system 140 connects to a computing device of the port server 100. For example, the device 146 may be connected to the computing device 106 through a USB connection, either directly or through a USB hub. The port server 100 may assign a unique identifier, or ID, and a TCP port to the device 146 in a directory 200. The directory 200 may be stored on the port server 100, for example, in any suitable storage of any or all or all of the computing devices 102, 104, 106, and 108, and may be a directory that lists all of the hardware devices of the heterogenous system 140 that are connected to the port server 100 and the TCP ports the port server 100 has assigned to the devices. The directory 200 may be made available to computing systems and devices outside the port server 100, such as the control and monitoring systems 180, through a directory service running on the port server 100. The port number listed for a hardware device in the directory 200 may be the port number used by a computing system or device, such as the control and monitoring systems 180, to communicate with the hardware device through the port server 100. For example, to communicate with the device 146, the controller 181 may open a connection to TCP port 17395 on the port server 100. The port server 100 may send any communications received on TCP port 17395 to the hardware device 146.

Figure 3A:
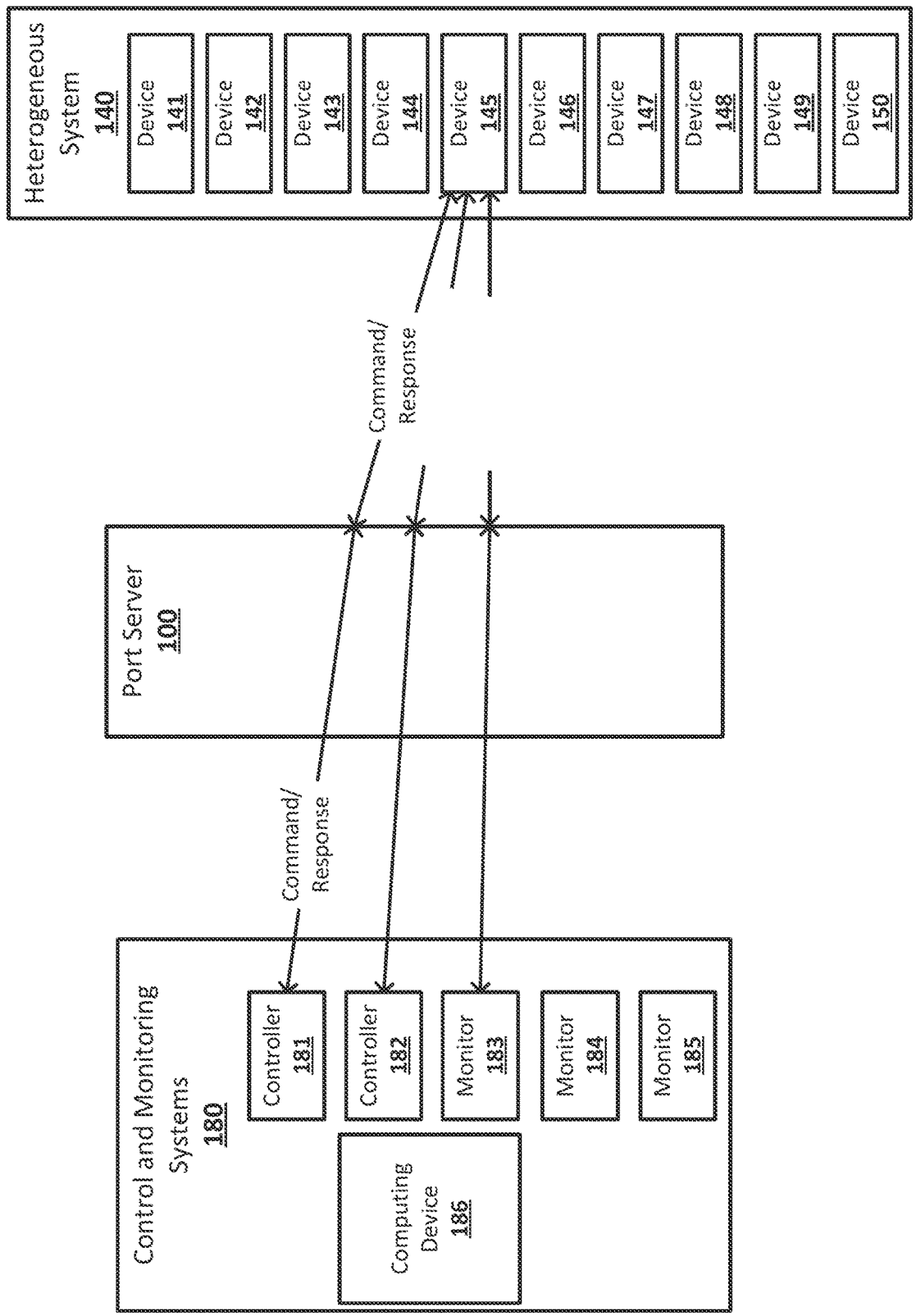
FIG. 3A shows an example arrangement suitable for a port server for heterogeneous hardware according to an implementation of the disclosed subject matter.

FIG. 3A shows an example arrangement suitable for a port server for heterogeneous hardware according to an implementation of the disclosed subject matter. The port server 100 may multiplex communications between the control and monitoring systems 180 and devices of the heterogenous system 140. For example, the controller 181, the controller 182, and the monitor 183 may all open connections to the device 145 through the port server 100. The port server 100 may multiplex the communications between the controller 181, the controller 182, and the monitor 183, and the device 145. At any given time, the port server 100 may only allow communications between one of the controller 181, the controller 182, and the monitor 183 and the device 145, for example, using time division multiplexing. For example, the port server 100 may first allow the controller 181 to communicate with the device 145. The controller 181 may send commands, including, for example, batched commands in a packet built by the controller 181 or the computing device 186, to the device 145 through the TCP endpoint exposed by the port server 100. The port server 100 may include drivers for the device 145, and may make any necessary changes or adjustments to commands from the controller 181 to ensure that the commands use the protocols and syntax recognized by the device 145. Responses from the device 145 to the received commands from the controller 181, for example, confirming execution of the commands and providing status updates after the commands are executed, may be sent to the port server 100, which may unicast the response to the controller 181. The controller 181 may be unaware that the controller 182 and the monitor 183 also have open connections to the device 145, and the port server 100 may not allow communication between the controller 182 and the monitor 183 and the device 145 until the command and response cycle for the controller 181 completes with the controller 181 receiving a response from the device 145.

Figure 3B:
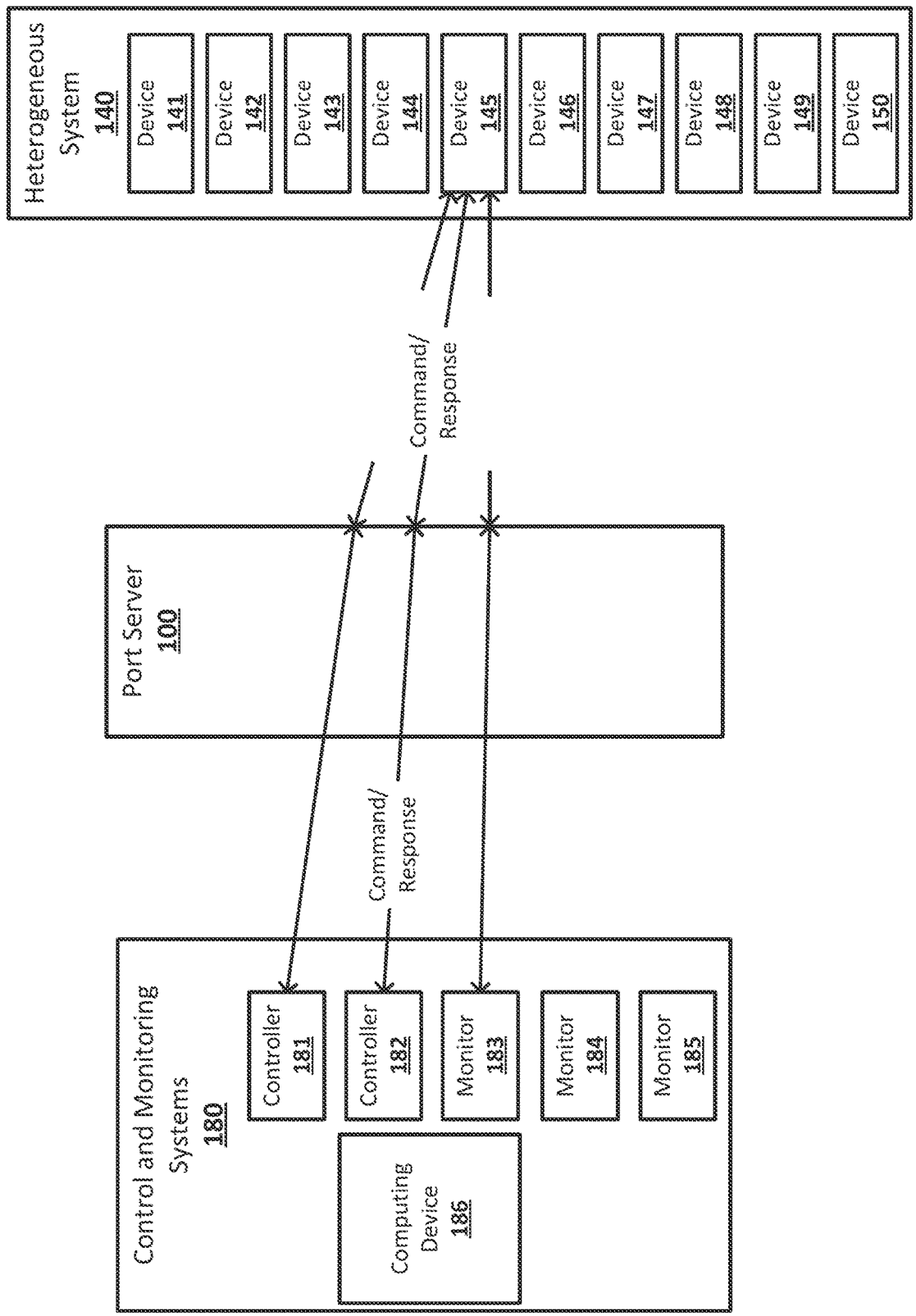
FIG. 3B shows an example arrangement suitable for a port server for heterogeneous hardware according to an implementation of the disclosed subject matter.

FIG. 3B shows an example arrangement suitable for a port server for heterogeneous hardware according to an implementation of the disclosed subject matter. The port server 100 may multiplex communications between the control and monitoring systems 180 and devices of the heterogenous system 140. For example, the controller 181, the controller 182, and the monitor 183 may all open connections to the device 145 through the port server 100. The port server 100 may multiplex the communications between the controller 181, the controller 182, and the monitor 183, and the device 145. At any given time, the port server 100 may only allow communications between one of the controller 181, the controller 182, and the monitor 183 and the device 145, for example, using time division multiplexing. For example, after the port server 100 allows the controller 181 to communicate with the device 145, and the command and response cycle between the controller 181 and the device 145 completes, the port server 100 may allow the controller 182 to communicate with the device 145, and may temporarily stop communication between the controller 181 and the device 145. The controller 182 may send commands, including, for example, batched commands in a packet built by the controller 182 or the computing device 186, to the device 145 through the TCP endpoint exposed by the port server 100. The port server 100 may include drivers for the device 145, and may make any necessary changes or adjustments to commands from the controller 182 to ensure that the commands use the protocols and syntax recognized by the device 145. Responses from the device 145 to the received commands from the controller 182, for example, confirming execution of the commands and providing status updates after the commands are executed, may be sent to the port server 100, which may unicast the response to the controller 182. The controller 182 may be unaware that the controller 181 and the monitor 183 also have open connections to the device 145, and the port server 100 may not allow communication between the controller 181 and the monitor 183 and the device 145 until the command and response cycle for the controller 182 completes with the controller 182 receiving a response from the device 145.

Figure 3C:
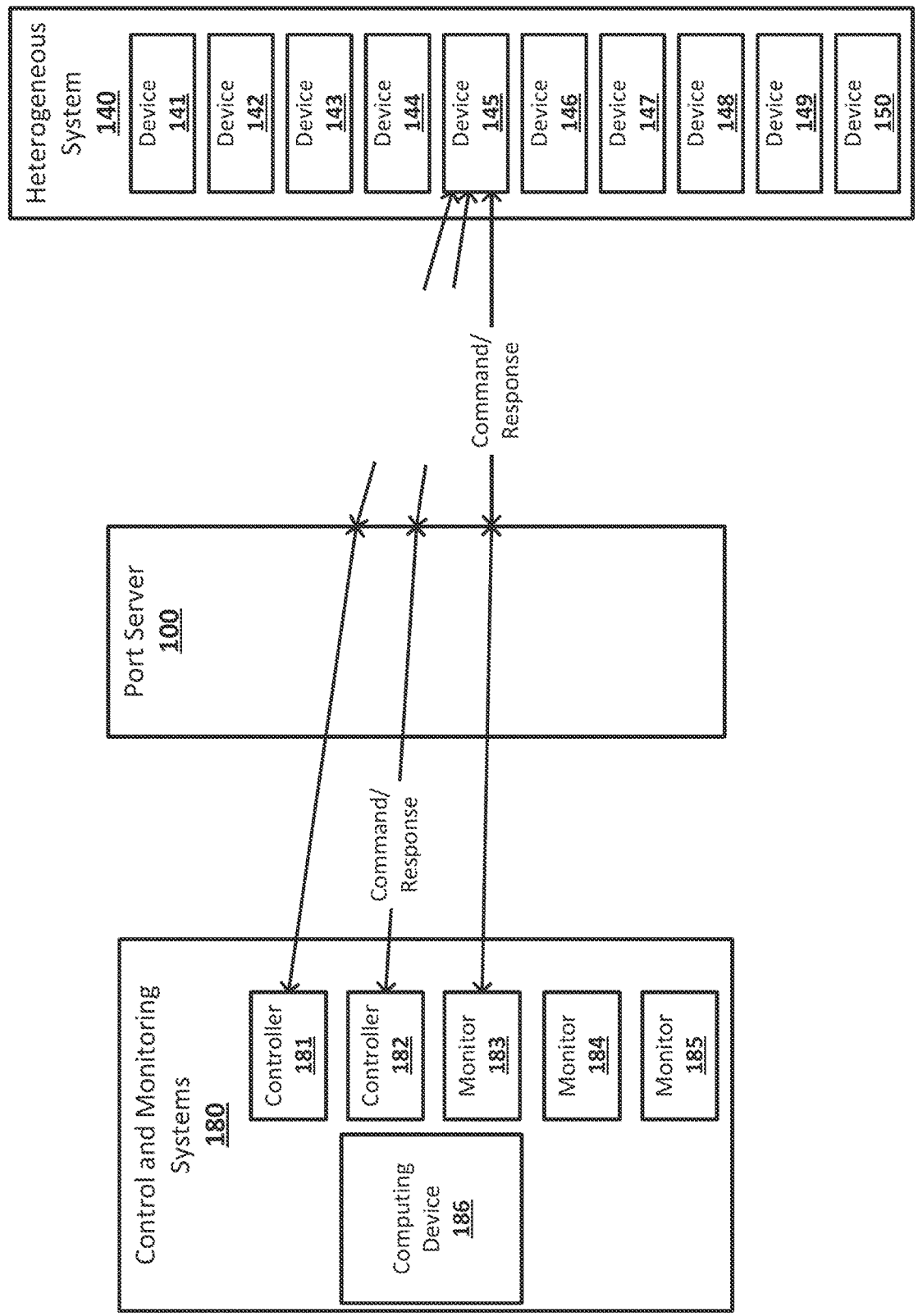
FIG. 3C shows an example arrangement suitable for a port server for heterogeneous hardware according to an implementation of the disclosed subject matter.

FIG. 3C shows an example arrangement suitable for a port server for heterogeneous hardware according to an implementation of the disclosed subject matter. The port server 100 may multiplex communications between the control and monitoring systems 180 and devices of the heterogenous system 140. For example, the controller 181, the controller 182, and the monitor 183 may all open connections to the device 145 through the port server 100. The port server 100 may multiplex the communications between the controller 181, the controller 182, and the monitor 183, and the device 145. At any given time, the port server 100 may only allow communications between one of the controller 181, the controller 182, and the monitor 183 and the device 145, for example, using time division multiplexing. For example, after the port server 100 allows the controller 181 and the controller 182 to communicate with the device 145, and the command and response cycle between the controller 181 and the controller 182 and the device 145 completes, the port server 100 may allow the monitor 183 to communicate with the device 145, and may temporarily stop communication between the controller 181 and the controller 182 and the device 145. The monitor 183 may send commands, including, for example, batched commands in a packet built by the monitor 183 or the computing device 186, to the device 145 through the TCP endpoint exposed by the port server 100. The port server 100 may include drivers for the device 145, and may make any necessary changes or adjustments to commands from the monitor 183 to ensure that the commands use the protocols and syntax recognized by the device 145. Responses from the device 145 to the received commands from the monitor 183, for example, providing responses to requests from the monitor 183 for measurements taken by the device 145 of metrics for the device 145, another device of the heterogenous system 145, or the heterogenous system 140 itself, may be sent to the port server 100, which may unicast the response to the monitor 183. The monitor 183 may be unaware that the controller 181 and the controller 182 also have open connections to the device 145, and the port server 100 may not allow communication between the controller 181 and the controller 182 and the device 145 until the command and response cycle for the monitor 183 completes with the monitor 183 receiving a response from the device 145. Once the command and response cycle completes for the monitor 183, the port server 100 may again allow the controller 181 to communicate with the device 145 if the controller 181 has maintained an open connection to the device 145. The port server 100 may also allow another device or system of the control and monitoring systems 180 to communicate with the device 145 if such a device or system, for example, the monitor 184, has opened a connection to the device 145 through its TCP endpoint in the intervening time. This may allow multiple devices and systems of the control and monitoring systems 180 to maintain open connections with and communicate with a single device of the heterogenous system 140 without any devices and systems of the control and monitoring systems 180 being aware that other devices and systems of the control and monitoring systems 180 have open connections to or are communication with the device of the heterogenous system 140.

Figure 4:
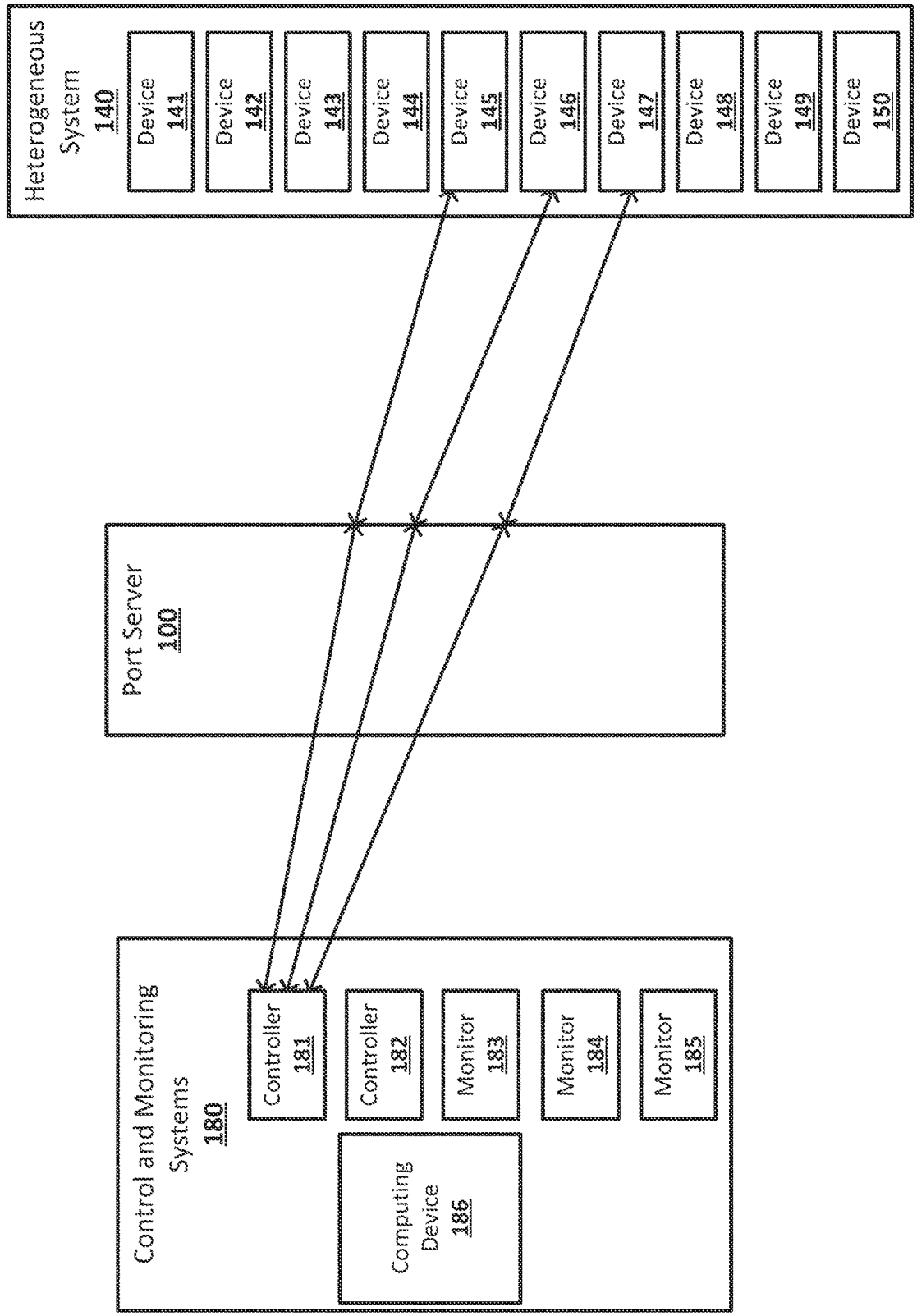
FIG. 4 shows an example arrangement suitable for a port server for heterogeneous hardware according to an implementation of the disclosed subject matter.

FIG. 4 shows an example arrangement suitable for a port server for heterogeneous hardware according to an implementation of the disclosed subject matter. The port server 100 may allow devices and systems of the control and monitoring systems 180 to have open connections to multiple devices of the heterogenous system 140. For example, the controller 181 may have open connections to the device 145, the device 146, and the device 147 through the port server 100. The devices 145, 146, and 147 may be, for example, devices of the same type, such as lasers, which may be from different manufacturers, or may be different models from the same manufacturer. The port server 100 may present the devices 145, 146, and 147 to the controller 181 as if they are the same type of device from the same manufacturer, such that the controller 181 may send prepare commands for the devices 145, 146, and 147 in the same manner without reference to differences in the syntax or protocols used by the devices 145, 146, and 147. The port server 100 may include drivers for the devices 145, 146, and 147, for example, on any of the computing devices 102, 104, 106, and 108, and may ensure that any commands received from the controller 181 intended for the devices 145, 146, and 147 are converted to use the proper syntax and protocols for the devices 145, 146, and 147. This may allow the control and monitoring systems 180 to communicate with the various devices of the heterogenous system 140 based on the type of the device, for example, the function of the device, without regard for the specific manufacturer or model of a device. The port server 100 may, for example, make heterogenous laser devices appear to be homogenous laser devices to the control and monitoring systems 180.

Figure 5:
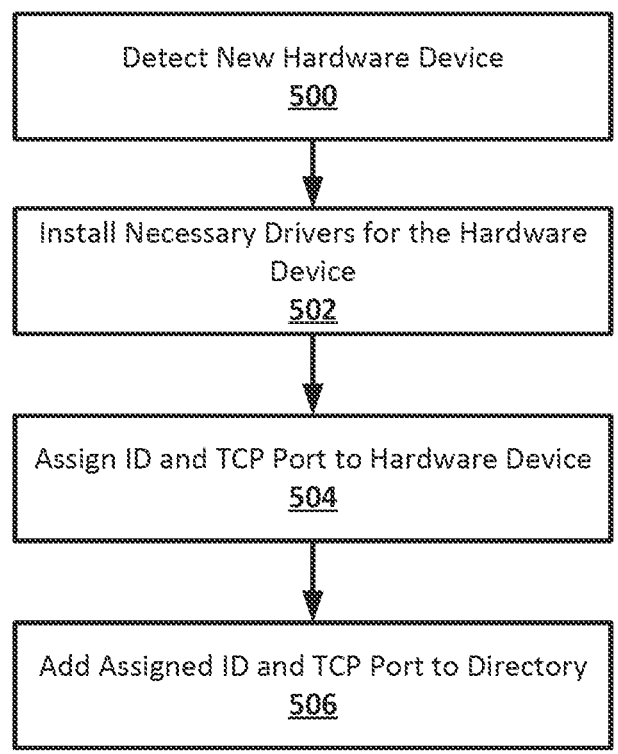
FIG. 5 shows an example procedure suitable for a port server for heterogeneous hardware according to an implementation of the disclosed subject matter.

FIG. 5 shows an example procedure suitable for a port server for heterogeneous hardware according to an implementation of the disclosed subject matter. At 500, a new hardware device may be detected. For example, the one of the computing devices 102, 104, 106, and 108 of the port server 100 may detect the connection of new hardware device of the heterogenous system 180, such as, for example, the hardware device 145. The hardware device 145 may be connected through a USB connection, TCP connection, or any other suitable connection.

At 502, necessary drivers for the hardware device may be installed. For example, the computing device 104 may detect that the hardware device 145 has been connected to the computing device 104 through a USB connection. The computing device 104 may automatically install any necessary drivers for allowing the computing device 104, and the port server 100, to communicate with, including sending commands to and receiving responses from, the hardware device 145. The drivers may be installed in any suitable manner, from any suitable source. For example, the drivers may already be stored in a storage device of, or accessible to, the computing device 104 locally, or the computing device 104 may obtain any necessary drivers through a wide area network connection, such as through the internet.

At 504, an ID and TCP port may be assigned to the hardware device. For example, the computing device 104 of the port server 100 may assign a unique ID and a TCP port to the hardware device that has just been detected as connected to the computing device 104. The unique ID may be an identifier for the hardware device 145 that may allow for the port server 100 and any system that connects to the port server 100, such as, for example, the control and monitoring systems 180, to identify the hardware device 145 and distinguish the hardware device 145 from other hardware devices of the heterogenous system 140. The TCP port assigned by the computing device 104 to hardware device 145 may be at any suitable TCP port number of the port server 100, for example, a TCP port number that is not for a TCP port already assigned to a hardware device of the heterogenous system 140 or assigned or reserved for any other purpose.

At 506, the assigned ID and TCP port may be added to a directory. For example, the port server 100 may maintain a directory, such as the directory 200, which lists all of the hardware devices of the heterogenous system 140 that are connected to the port server 100. The computing device 104 may add the ID and TCP port assigned to the hardware device 145 to the directory 200, exposing the hardware device 145 to other devices and systems, such as the control and monitoring systems 180, as a TCP endpoint. The directory 200 may be accessible through a directory service running on the port server 100. The entry for the hardware device 145 in the directory 200 may identify what type of device the hardware device 145 is, for example, as part of the unique ID assigned to the hardware device 145 or through additional data in the directory 200. For example, if the hardware device 145 is a laser, a device or system that accesses the directory 200 may be able to determine that the device accessible on the TCP port assigned to the hardware device 145 is a laser.

Figure 6:
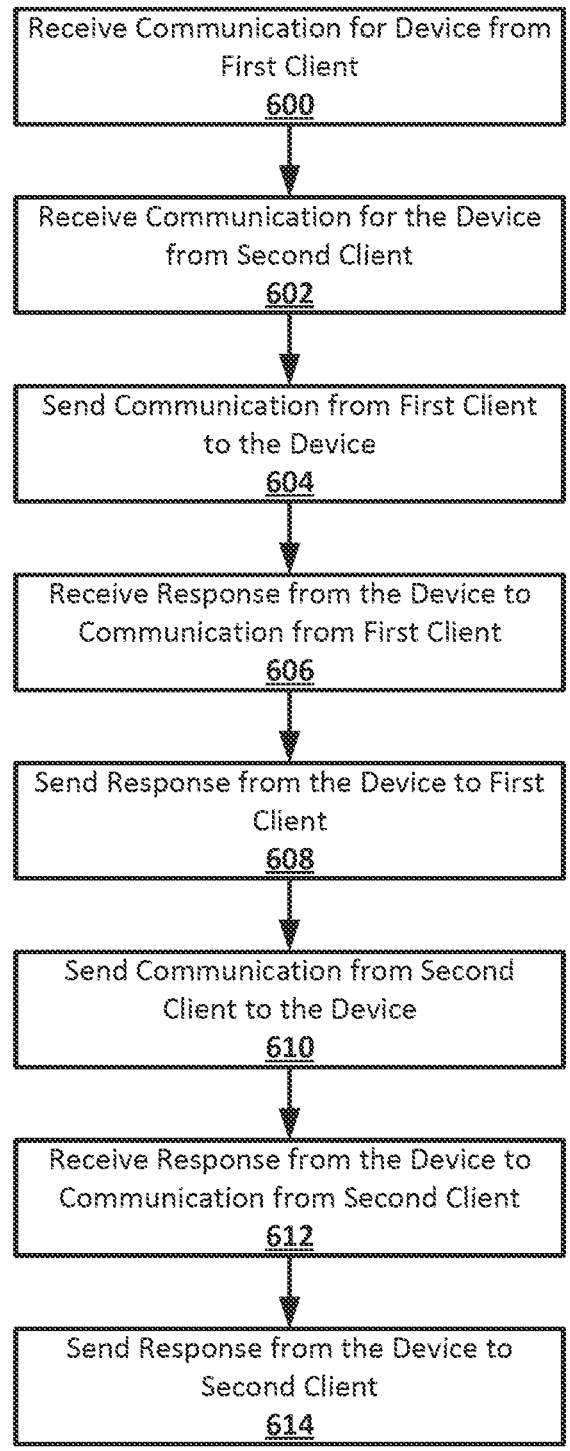
FIG. 6 shows an example procedure suitable for a port server for heterogeneous hardware according to an implementation of the disclosed subject matter.

FIG. 6 shows an example procedure suitable for a port server for heterogeneous hardware according to an implementation of the disclosed subject matter. At 600, a communication for a device may be received from a first client. For example, the port server 100 may receive a communication from the controller 181 intended for the hardware device 145. The controller 181 may send the communication, which may include, for example, commands for the hardware device 145, in any suitable form, including, for example, in data packets, through a connection between the controller 181 and the TCP port assigned to the hardware device 145 on the port server 100.

At 602, a communication for the device may be received from a second client. For example, the port server 100 may receive a communication from the controller 182 intended for the hardware device 145. The controller 182 may send the communication, which may include, for example, commands for the hardware device 145, in any suitable form, including, for example, in data packets, through a connection between the controller 182 and the TCP port assigned to the hardware device 145 on the port server 100.

At 604, the communication from the first client may be sent to the device. For example, the port server 100 may multiplex the connections of the controller 181 and the controller 182 to the device 145, and may first send the communication received from the controller 181 to hardware device 145. The communication may be sent by the port server 100 over the TCP, USB, or other connection that connects the hardware device 145 to any of the computing devices 102, 104, 106, and 108. If the communication is sent to the hardware device 145 over TCP, the connection may use a TCP port different from the TCP port assigned to the hardware device 145 and listed in the directory 200. Before sending the communication to the hardware device 145, the port server 100 may encapsulate, modify, adjust, or otherwise rewrite, either in situ or as a copy, the communication from the controller 181. In some implementations, the port server 100 may encapsulate communications without making any modifications to the communications.

At 606, a response to the communication from the first client may be received from the device. For example, the port server 100 may receive a response sent by the hardware device 145 responding to the communication sent to the hardware device 145 by the port server 100. The communication may have included, for example, commands to be executed by the hardware device 145. The response from the hardware device 145 may include the results of executing the commands in the communication, including, for example, status updates for the status of the hardware device 145, other hardware devices of the heterogenous system 140, or the heterogenous system 140 itself. The response from the hardware device 145 may be received at the port server 100 over the same connection used by the port server 100 to send the communication to the hardware device 145. The port server 100 may associate the response from the hardware device 145 with the communication from the first client, for example, the controller 181, in any suitable manner.

At 608, the response from the device may be sent to the first client. For example, the port server 100 may send the response from the hardware device 145, responding to a communication that originated at the controller 181, to the controller 181. The port server 100 may unicast the response from the hardware device 145 to the controller 181, or may broadcast the response from the hardware device 145 along with the original communication from the controller 181 to all devices and systems with open connections to TCP ports on the port server 100, which may include the controller 181.

At 610, the communication from the second client may be sent to the device. For example, the port server 100 may multiplex the connections of the controller 181 and the controller 182 to the device 145, and may send the communication received from the controller 182 to hardware device 145 only after the controller 181 has completed a command and response cycle with the hardware device 145. The communication that originated with the controller 182 may be sent by the port server 100 over the TCP, USB, or other connection that connects the hardware device 145 to any of the computing devices 102, 104, 106, and 108. If the communication is sent to the hardware device 145 over TCP, the connection may use a TCP port different from the TCP port assigned to the hardware device 145 and listed in the directory 200. Before sending the communication to the hardware device 145, the port server 100 may modify, adjust, or otherwise rewrite, either in situ or as a copy, the communication from the controller 182.

At 612, a response to the communication from the second client may be received from the device. For example, the port server 100 may receive a response sent by the hardware device 145 responding to the communication sent to the hardware device 145 by the port server 100. The communication may have included, for example, commands to be executed by the hardware device 145. The response from the hardware device 145 may include the results of executing the commands in the communication, including, for example, status updates for the status of the hardware device 145, other hardware devices of the heterogenous system 140, or the heterogenous system 140 itself. The response from the hardware device 145 may be received at the port server 100 over the same connection used by the port server 100 to send the communication to the hardware device 145. The port server 100 may associate the response from the hardware device 145 with the communication from the first client, for example, the controller 182, in any suitable manner.

At 614, the response from the device may be sent to the second client. For example, the port server 100 may send the response from the hardware device 145, responding to a communication that originated at the controller 182, to the controller 182. The port server 100 may unicast the response from the hardware device 145 to the controller 182, or may broadcast the response from the hardware device 145 along with the original communication from the controller 182 to all devices and systems with open connections to TCP ports on the port server 100, which may include the controller 182.

Figure 7:
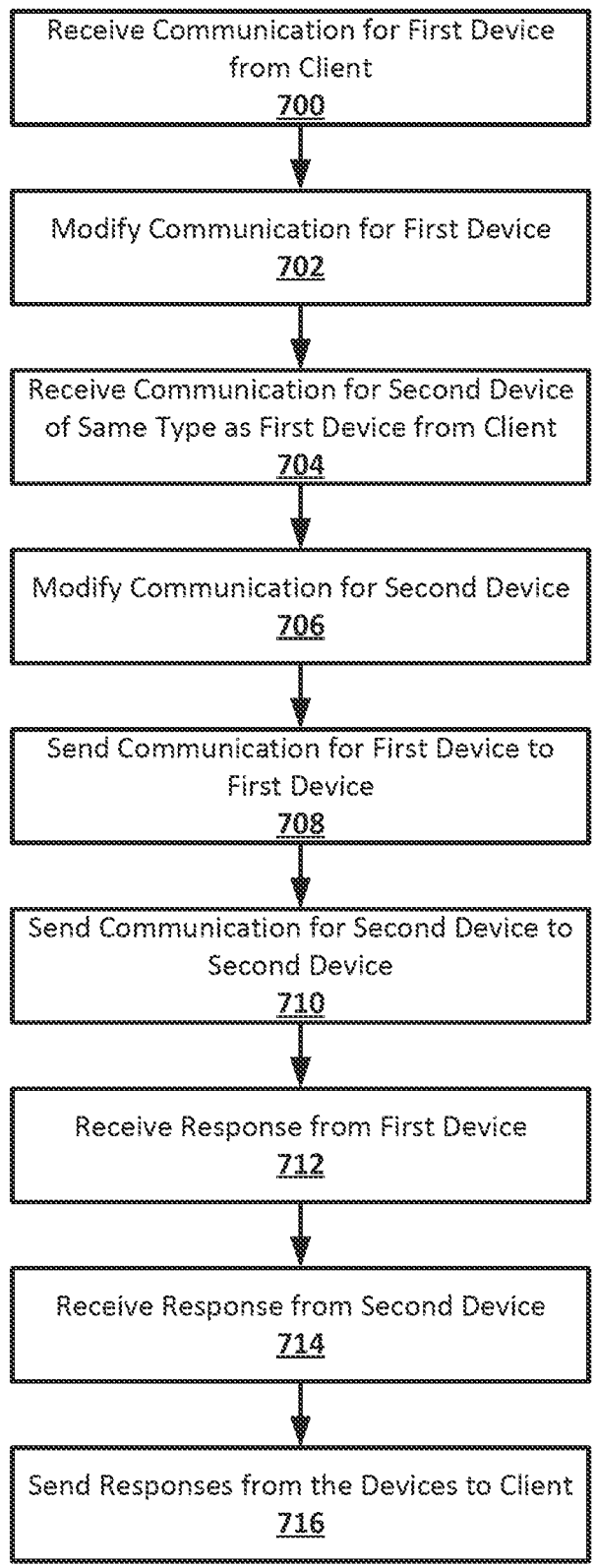
FIG. 7 shows an example procedure suitable for a port server for heterogeneous hardware according to an implementation of the disclosed subject matter.

FIG. 7 shows an example procedure suitable for a port server for heterogeneous hardware according to an implementation of the disclosed subject matter. At 700, a communication for a first device may be received from a client. For example, the port server 100 may receive a communication from the controller 181 intended for the hardware device 149. The controller 181 may send the communication, which may include, for example, commands for the hardware device 149, in any suitable form, including, for example, in data packets, through a connection between the controller 181 and the TCP port assigned to the hardware device 149 on the port server 100.

At 702, the communication for the first device may be modified. For example, the port server 100 may encapsulate, modify, adjust, or otherwise rewrite, either in situ or as a copy, the communication from the controller 181.

At 704, a communication for a second device of the same type as the first device may be received from the client. For example, the port server 100 may receive a communication from the controller 181 intended for the hardware device 150. The hardware device 150 may be of the same type as the hardware device 149, but of a different model or from a different manufacturer. For example, both the hardware device 149 and the hardware device 150 may be servo motors of a trapped ion quantum computing device. The device 149 may be a servo motor from a first manufacturer, and the hardware device 150 may be a servo motor from a second manufacturer different from the first manufacturer. The controller 181 may send the communication, which may include, for example, commands for the hardware device 150, in any suitable form, including, for example, in data packets, through a connection between the controller 181 and the TCP port assigned to the hardware device 149 on the port server 100.

At 706, the communication for the second device may be modified. For example, the port server 100 may encapsulate, modify, adjust, or otherwise rewrite, either in situ or as a copy, the communication from the controller 181.

At 708, the communication for the first device may be sent to the first device. For example, the communication for the first device received from the controller 181, as modified by the port server 100, may be sent by the port server 100 over the TCP, USB, or other connection that connects the hardware device 149 to any of the computing devices 102, 104, 106, and 108. If the communication is sent to the hardware device 149 over TCP, the connection may use a TCP port different from the TCP port assigned to the hardware device 149 and listed in the directory 200.

At 710, the communication for the second device may be sent to the second device. For example, the communication for the second device received from the controller 181, as modified by the port server 100, may be sent by the port server 100 over the TCP, USB, or other connection that connects the hardware device 150 to any of the computing devices 102, 104, 106, and 108. If the communication is sent to the hardware device 150 over TCP, the connection may use a TCP port different from the TCP port assigned to the hardware device 150 and listed in the directory 200.

At 712, a response may be received from the first device. For example, the port server 100 may receive a response sent by the hardware device 149 responding to the communication for the hardware device 149 from the controller 181 sent to the hardware device 149 by the port server 100. The communication may have included, for example, commands to be executed by the hardware device 149. The response from the hardware device 149 may include the results of executing the commands in the communication, including, for example, status updates for the status of the hardware device 149, other hardware devices of the heterogenous system 140, or the heterogenous system 140 itself. The response from the hardware device 149 may be received at the port server 100 over the same connection used by the port server 100 to send the communication to the hardware device 149. The port server 100 may associate the response from the hardware device 149 with the communication from the first client, for example, the controller 181, in any suitable manner.

At 714, a response may be received from the second device. For example, the port server 100 may receive a response sent by the hardware device 150 responding to the communication for the hardware device 150 from the controller 181 sent to the hardware device 150 by the port server 100. The communication may have included, for example, commands to be executed by the hardware device 150. The response from the hardware device 150 may include the results of executing the commands in the communication, including, for example, status updates for the status of the hardware device 150, other hardware devices of the heterogenous system 140, or the heterogenous system 140 itself. The response from the hardware device 150 may be received at the port server 100 over the same connection used by the port server 100 to send the communication to the hardware device 150. The port server 100 may associate the response from the hardware device 150 with the communication from the first client, for example, the controller 181, in any suitable manner.

At 716, the response from the first device and the second device may be sent to the client. For example, the port server 100 may send the responses from the hardware device 149 and the hardware device 150, responding to communications that originated at the controller 181, to the controller 181. The port server 100 may unicast the responses from the hardware device 149 and the hardware device 150 to the controller 182, or may broadcast the responses from the hardware device 149 and the hardware device 150 along with the original communications from the controller 181 to all devices and systems with open connections to TCP ports on the port server 100, which may include the controller 181.

Figure 8:
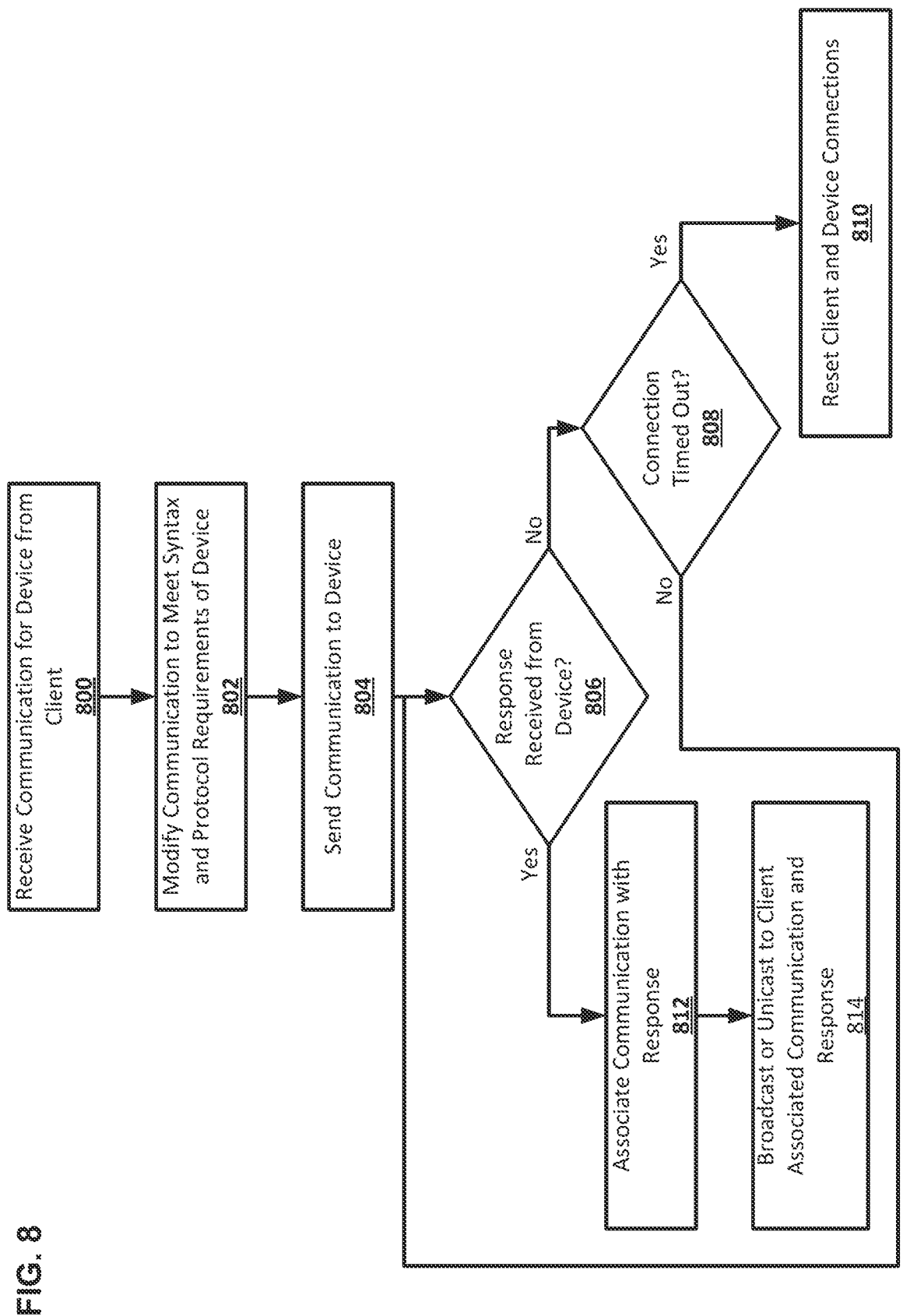
FIG. 8 shows an example procedure suitable for a port server for heterogeneous hardware according to an implementation of the disclosed subject matter.

FIG. 8 shows an example procedure suitable for a port server for heterogeneous hardware according to an implementation of the disclosed subject matter. At 800, a communication for a device may be received from a client. For example, the port server 100 may receive a communication from the controller 181 intended for the hardware device 145. The controller 181 may send the communication, which may include, for example, commands for the hardware device 145, in any suitable form, including, for example, in data packets, through a connection between the controller 181 and the TCP port assigned to the hardware device 145 on the port server 100.

At 802, the communication may be modified to meet syntax and protocol requirements of the device. For example, the port server 100 may encapsulate, modify, adjust, or otherwise rewrite, either in situ or as a copy, the communication from the controller 181.

At 804, the communication may be sent to the device. For example, the communication received from the controller 181, as modified by the port server 100, may be sent by the port server 100 over the TCP, USB, or other connection that connects the hardware device 145 to any of the computing devices 102, 104, 106, and 108. If the communication is sent to the hardware device 145 over TCP, the connection may use a TCP port different from the TCP port assigned to the hardware device 145 and listed in the directory 200.

At 806, if a response is received from the device, flow may proceed to 812, otherwise, flow may proceed to 808. For example, the hardware device 145, after receiving the communication from the port server 100, may execute any commands included in the communication and send a response back to the port server 100 that may include, for example, updates on the execution of the command and status updates and measurements of metrics for the hardware device 145 and the heterogenous system 180 and its other devices. When the port server 100 receives the response, flow may proceed to 812, where the response may be processed. While a response has not been received at the port server 100, flow may proceed to 808, where the port server 100 may determine whether the connection to the hardware device 145 has timed out.

At 808, if the connection has timed out, flow may proceed to 810, otherwise flow may proceed back to 806. For example, while the port server 100 is waiting to receive a response from the hardware device 145, the port server 100 may check the amount of time elapsed since the communication was sent to the hardware device 145 against a timeout period. The timeout period may be set by, for example, a timeout value in the communication from the controller 181. If the amount of time elapsed since the communication was sent to the hardware device 145 exceeds the timeout period, the connection between the port server 100 and the hardware device 145 may be considered to have timed out, and flow may proceed to 810, where the port server 100 may reset the connection. Otherwise, if the connection has not timed out, the port server 100 may continue to wait for a response from the hardware device 145 at 806.

At 810, the connections from the client and the device may be reset. For example, the port server 100 may have determined that the connection between the port server 100 and the hardware device 145 has timed out based on not receiving a response from the hardware device 145 to the communication that originated at the controller 181 within the timeout period. The port server 100 may reset the connections of both the controller 181 and the hardware device 145 to the port server 100, for example, closing the connection of the controller 181 to the TCP port of the port server 100 assigned to the hardware device 145 and closing the connection of the hardware device 145 to the port server 100. This may cause both the controller 181 and the hardware device 145 to reset their connections, opening new connections with the port server 100.

At 812, the communication may be associated with the response. For example, the port server 100 may associate the response from the hardware device 145 with the communication that originated at the controller 181 and was sent to the hardware device 145 and to which the hardware device 145 responded.

At 814, the associated communication and response may be broadcast or unicast to the client. For example, the port server 100 may unicast the response from the hardware device 145, and optionally, the associated communication, directly to the controller 181, or the port server 100 may broadcast the communication and response to all of the control and monitoring systems 180 with connections to the port server 180. If the communication and response are broadcast, the controller 181 may identify the response based on the associated communication that originated at the controller 181.

Figure 9:
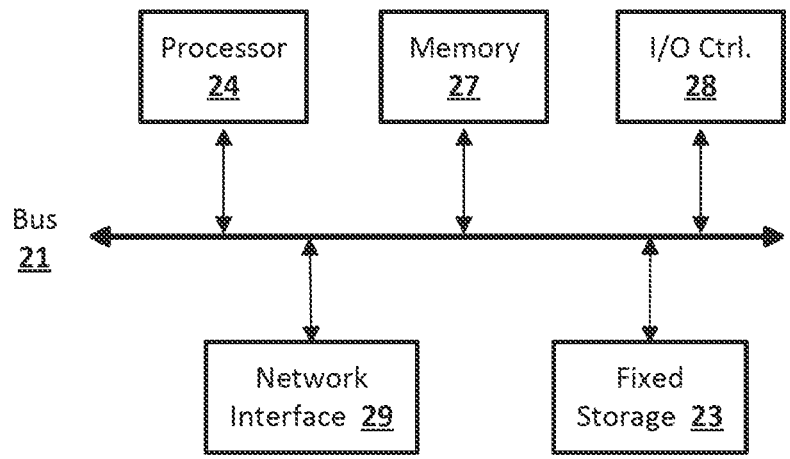
FIG. 9 shows a computer according to an embodiment of the disclosed subject matter.

Embodiments of the presently disclosed subject matter may be implemented in and used with a variety of component and network architectures. FIG. 9 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 10.

Many other devices or components (not shown) may be connected in a similar manner, such as document scanners, digital cameras, auxiliary, supplemental, or backup systems, or the like. Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 10:
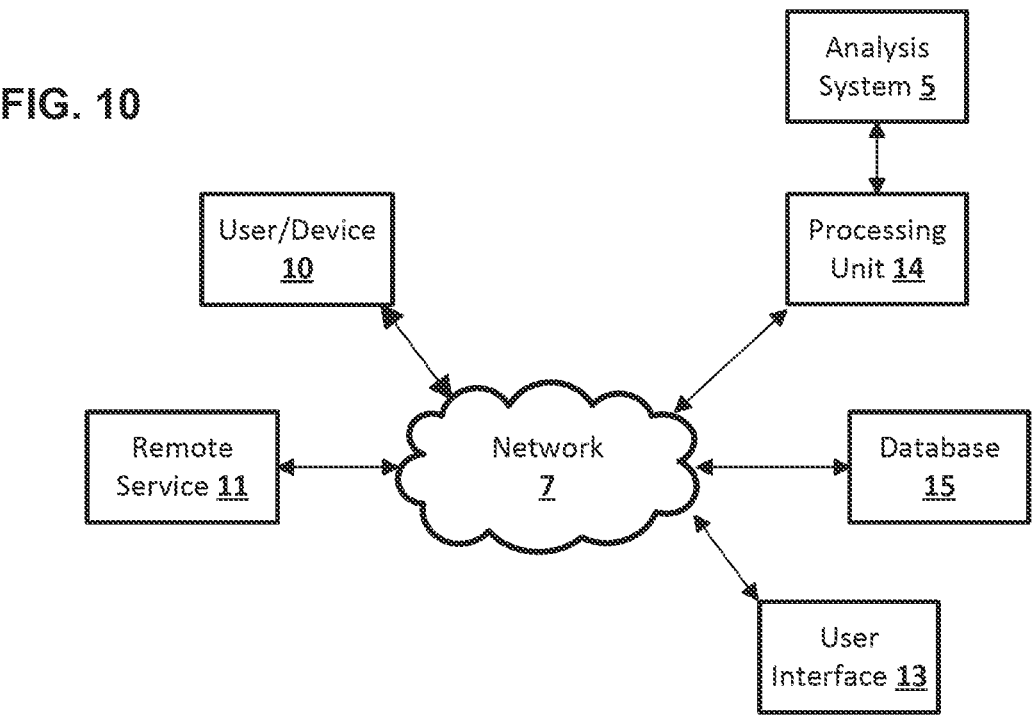
FIG. 10 shows a network configuration according to an embodiment of the disclosed subject matter.

FIG. 10 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

General Hardware Configurations

FIG. 11 shows a partial view of an ion trap quantum computer according to an embodiment of the disclosed subject matter. The ion trap quantum computer, or system 1100, includes a classical (digital) computer 1101, a system controller 1118 and a quantum register that is a chain 1102 of trapped ions (i.e., five shown) that extend along the Z-axis. Each ion in the chain 1102 of trapped ions is an ion having a nuclear spin/and an electron spins such that a difference between the nuclear spin I and the electron spin S is zero, such as a positive ytterbium ion, $^{171}Yb^+$, a positive barium ion $^{133}Ba^+$, a positive cadmium ion $^{111}Cd^+$ or $^{113}Cd^+$, which all have a nuclear spin I=½ and the $^2S_{1/2}$ hyperfine states. In some embodiments, all ions in the chain 1102 of trapped ions are the same species and isotope (e.g., $^{171}Yb^+$).

In some other embodiments, the chain 1102 of trapped ions includes one or more species or isotopes (e.g., some ions are $^{171}Yb^+$ and some other ions are $^{133}Ba^+$). In yet additional embodiments, the chain 1102 of trapped ions may include various isotopes of the same species (e.g., different isotopes of Yb, different isotopes of Ba). The ions in the chain 1102 of trapped ions are individually addressed with separate laser beams.

The classical computer 1101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 1104, such as an objective lens with a numerical aperture (NA), for example, of 0.37, collects fluorescence along the Y-axis from the ions and maps each ion onto a multi-channel photo-multiplier tube (PMT) 1106 for measurement of individual ions. Non-copropagating Raman laser beams from a laser 1108, which are provided along the X-axis, perform operations on the ions. A diffractive beam splitter 1110 creates an array of static Raman beams 1112 that are individually switched using a multi-channel acousto-optic modulator (AOM) 1114 and is configured to selectively act on individual ions. A global Raman laser beam 1116 illuminates ions at once. In some embodiments, individual Raman laser beams 1116 (not shown) each illuminate individual ions. The system controller (also referred to as a "RF controller") 1118 controls the AOM 1114. The system controller 1118 includes a central processing unit (CPU) 1120, a read-only memory (ROM) 1122, a random access memory (RAM) 1124, a storage unit 1126, and the like. The CPU 1120 is a processor of the RF controller 1118. The ROM 1122 stores various programs and the RAM 1124 is the working memory for various programs and data. The storage unit 1126 includes a nonvolatile memory, such as a hard disk drive (HDD) or a flash memory, and stores various programs even if power is turned off. The CPU 1120, the ROM 1122, the RAM 1124, and the storage unit 1126 are interconnected via a bus 1128. The RF controller 1118 executes a control program which is stored in the ROM 1122 or the storage unit 1126 and uses the RAM 1124 as a working area. The control program will include one or more software applications that include program code (e.g., instructions) that may be executed by a processor in order to perform various functionalities associated with receiving and analyzing data and controlling any and all aspects of the methods and hardware used to create the ion trap quantum computer system 1100 discussed herein.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented system comprising:
one or more computing devices, each comprising two or more connection types; and
one or more storage devices connected to the one or more computing devices, wherein the one or more computing devices receive a communication comprising two or more commands from an external computing device intended for hardware devices of a heterogenous system over one of the one or more connection types wherein the hardware devices are of the same type and a first of the hardware devices uses a syntax for commands different than a syntax for commands used by the second of the hardware devices;
convert the two or more commands in the communication to use the syntax used by the first of the hardware devices and to use the syntax used by the second of the hardware devices,
batch the two or more commands converted to use the syntax used by the first of the hardware devices into a first packet and the two or more commands converted to use the syntax used by the second of the hardware devices into a second packet;
send the first packet and a first control packet to the first of the hardware devices of the heterogenous system using one of the one or more connection types and the second packet and a second control packet to the second of the hardware devices of the heterogenous system using one of the one or more connection types, wherein the first control packet indicates a number of responses expected in response to the first packet and the second control packet indicates a number of responses expected in response to the second packet,
receive responses from the hardware devices of the heterogenous system over the one of the one or more connection types used to send the communication to the hardware devices, and
send the responses from the hardware devices of the heterogenous system to the external computing device over the one of the one or more connection types over which the communication was received from the external computing device.

2. The system of claim 1, wherein the one of the one or more connection types over which the communication is received from the external computing device is different from the one of the one or more connection types used to send the communication to the hardware device of the heterogenous system.

3. The system of claim 1, wherein the one or more computing devices, before sending the communication to the hardware devices of the heterogenous system, modify or encapsulate the communication.

4. The system of claim 1, wherein the one or more computing devices receive a third communication from the external computing device intended for a third hardware device of the heterogenous system,
send the third communication to the third hardware device of the heterogenous system using one of the one or more connection types,
receive a response from the third hardware device of the heterogenous system over the one of the one or more connection types used to send the third communication to the third hardware device, and
send the response from the third hardware device of the heterogenous system to the external computing device over the one of the one or more connection types over which the third communication was received from the external computing device.

5. The system of claim 1, wherein the one or more computing devices receive a third communication from a fourth hardware device of the heterogenous system, wherein the fourth hardware device of the heterogenous system sends the third communication not directly in response to a communication from any external computing device.

6. The system of claim 1, wherein the external computing devices comprises a control or monitoring system for the heterogenous system.

7. The system of claim 1, wherein the heterogenous system is a trapped ion quantum computing device.

8. The system of claim 1, wherein the one or more computing devices detect a connection of a third hardware device to one of the one or more computing devices,
assign an identifier to the third hardware device,
assign a port to the third hardware device, wherein the port is used by the one or more computing devices to receive communications from the external computing device over one of the one or more connection types, and
store the identifier and the port assigned to the third hardware device in a directory stored in the one or more storage devices.

9. The system of claim 1, wherein the one or more computing devices comprise a port server, and wherein the port server allows transparent multiplexed connections between two or more external computing devices and the hardware devices of the heterogenous system.

10. The system of claim 9, wherein the one or more computing devices of the port server store, in the one or more storage devices, drivers installed for the hardware devices of the heterogenous system, and wherein the drivers for the hardware devices are not installed on the one or more external computing devices.

11. The system of claim 1, wherein the one or more computing devices select the hardware devices of the heterogenous system using parameters of the hardware devices or device types of the hardware devices.

12. The system of claim 11, wherein the one or more computing devices further link a device type of the device types to a firmware update utility for the hardware devices of the device type, and updates firmware of the hardware devices of the device type using the firmware update utility.

13. A computer-implemented method performed by a data processing apparatus, the method comprising:
receiving, at a computing device, a communication comprising two or more commands from an external computing device intended for hardware devices of a heterogenous system over one of the one or more connection types wherein the hardware devices are of the same type and a first of the hardware devices uses a syntax for commands different than a syntax for commands used by the second of the hardware devices;
converting a the two or more commands in the communication to use the syntax used by the first of the hardware devices and to use the syntax used by the second of the hardware devices;
batching the two or more commands converted to use the syntax used by the first of the hardware devices into a first packet and the two or more commands converted to use the syntax used by the second of the hardware devices into a second packet;

sending the first packet and a first control packet to the first of the hardware devices of the heterogenous system using one of the one or more connection types and the second packet and a second control packet to the second of the hardware devices of the heterogenous system using one of the one or more connection types, wherein the first control packet indicates a number of responses expected in response to the first packet and the second control packet indicates a number of responses expected in response to the second packet;

receiving, by the computing device, responses from the hardware devices of the heterogenous system over the one of the one or more connection types used to send the communication to the hardware devices; and sending, by the computing device, the response from the hardware device of the heterogenous system to the external computing device over the one of the one or more connection types over which the communication was received from the external computing device.

14. The method of claim 13, wherein the one of the one or more connection types over which the communication is received from the external computing device is different from the one of the one or more connection types used to send the communication to the hardware device of the heterogenous system.

15. The method of claim 13, further comprising modifying or encapsulating, by the computing device, before sending the communication to the hardware devices of the heterogenous system, the communication.

16. The method of claim 13, further comprising:
receiving, by the computing device, a third communication from the external computing device intended for a third hardware device of the heterogenous system;
sending, by the computing device, the third communication to the third hardware device of the heterogenous system using one of the one or more connection types;
receiving, by the computing device, a response from the third hardware device of the heterogenous system over the one of the one or more connection types used to send the third communication to the third hardware device; and
sending, by the computing device, the response from the third hardware device of the heterogenous system to the external computing device over the one of the one or more connection types over which the third communication was received from the external computing device.

17. The method of claim 13, further comprising receiving, by the computing device, a third communication from a fourth hardware device of the heterogenous system, wherein the fourth hardware device of the heterogenous system sends the third communication not directly in response to a communication from any external computing device.

18. The method of claim 13, wherein the external computing devices comprises a control or monitoring system for the heterogenous system.

19. The method of claim 13, wherein the heterogenous system is a trapped ion quantum computing device.

20. The method of claim 13, further comprising;
detecting, by the computing device, a connection of a third hardware device to one of the one or more computing devices,
assigning, by the computing device, an identifier to the third hardware device,
assigning, by the computing device, a port to the third hardware device, wherein the port is used by the one or more computing devices to receive communications from the externa computing device over one of the one or more connection types, and
storing, by the computing device, the identifier and the port assigned to the third hardware device in a directory stored in one or more storage devices.

21. The method of claim 13, wherein the computing device is a component of a port server, and wherein the port server allows transparent multiplexed connections between one or more external computing devices and two or more hardware devices of the heterogenous system.

22. The method of claim 21, wherein the computing device of the port server stores, in the one or more storage devices, drivers installed for the two or more hardware devices, and wherein the drivers for the two or more hardware devices are not installed on the one or more external computing devices.

23. The method of claim 13, further comprising selecting, by the computing device, the hardware devices of the heterogenous system using parameters of the hardware devices or device types of the hardware devices.

24. The method of claim 23, further comprising linking, by the computing device, a device type of the device types to a firmware update utility for the hardware devices of the device type, and updating, by the computing device, firmware of the hardware devices of the device type using the firmware update utility linked to the device type.

* * * * *